United States Patent [19]

Houjiyou et al.

[11] Patent Number: 4,929,844

[45] Date of Patent: May 29, 1990

[54] APPARATUS FOR DETECTING THE PRESENCE AND SIZE OF A DOCUMENT

[75] Inventors: Yuji Houjiyou, Hashima; Hiroyuki Hayasaki, Ogaki; Kyoichi Yonezawa, Tottori, all of Japan

[73] Assignee: Sanyo Electric Co., Ltd., Osaka, Japan

[21] Appl. No.: 272,957

[22] Filed: Nov. 18, 1988

[30] Foreign Application Priority Data

Nov. 20, 1987 [JP] Japan .................................. 62-294857

[51] Int. Cl.$^5$ ............................................. G01N 21/86
[52] U.S. Cl. ...................................... 250/561; 250/560
[58] Field of Search ............... 250/561, 578, 557, 548, 250/560; 358/75, 78, 80, 280, 284, 285, 290, 293, 296

[56] References Cited

U.S. PATENT DOCUMENTS 4,458,264 7/1984 Tamura .................................. 358/75
4,734,762 3/1988 Aoki et al. ............................. 358/80

Primary Examiner—David C. Nelms
Attorney, Agent, or Firm—Armstrong, Nikaido, Marmelstein, Kubovcik & Murray

[57] ABSTRACT

The invention relates to a reading apparatus provided with a document table. More particularly, it relates to a reading apparatus which automatically detects the presence or absence of a document and/or the size of a document mounted on the document table. The reading apparatus related to the invention is provided with a light source which illuminates the document table and a means for collecting information about light intensity of the document table. The reading apparatus first gains information about light intensity of the document table when the light source is off and that when it is on, and then by comparing these informations, it detects the presence or absence of a document and/or the size of the document. Accordingly, the reading apparatus correctly detects the presence or absence of a document and/or the size of the document without being affected by external light even when the document cover remains open. Furthermore, the reading apparatus correctly detects the presence or absence of a document and/or the size of the document without taking the open and closed condition of the document cover into account.

15 Claims, 5 Drawing Sheets

APPARATUS FOR DETECTING THE PRESENCE AND SIZE OF A DOCUMENT

BACKGROUND OF THE INVENTION

1. Field of the Invention

The present invention relates to a reading apparatus, such as copying machine or a facsimile transmitter, which is provided with a document table, more particularly, to an apparatus which automatically detects the presence or absence of a document and/or the size of a document.

2. Description of the Prior Art

Some of conventional copying machines or facsimile transmitters automatically detect the size of a document in order to copy or transmit the document in accordance with the designated size of copy paper or receiving paper. There are specific arts used for detecting the size of the document like the one disclosed by Japanese Utility Model Publication No. 61-28195 (1986) or Japanese Patent Laid-Open No. 54-83438 (1979) for example.

Of these, the former art detects the size of document by intensity of light received by photoreceptive elements integrated in the document-cover of the document table. The latter art detects the size of document from the side-edge portion of the document by calculating black value of binary signals, i.e., black portion without presence of a document, from the start point of scanning line by image pickup element like line image sensors for example.

However, if a thick document is used, the document cover cannot be closed, leaving some opening which in turn allows entry of external light. This causes photoreceptive element to incorrectly detect the intensity of light and the size of document, thus eventually resulting in the erroneous copying or data-transmission.

SUMMARY OF THE INVENTION

The invention overcomes those problems mentioned above by providing a novel reading apparatus which detects the presence or absence of a document and/or the size of document by comparing informations about the light intensity of the document table when light source is on and when light source is off for illuminating it.

The primary object of the invention is to provide a novel reading apparatus which correctly detects the presence or absence of a document and/or the size of document without adversely being affected by external light even when the document cover remains open.

The second object of this invention is to provide a novel reading apparatus which automatically detects the presence or absence of a document and/or the size of document without taking the open or closed condition of document cover into consideration.

The third object of this invention is to provide a novel reading apparatus which securely prevents a facsimile transmitter from erroneously transmitting information as a result of incorrect detection of the size of document.

The fourth object of this invention is to provide a novel reading apparatus which securely prevents a copying machine from erroneously copying information as a result of incorrect detection of the size of document.

The above and further objects and features of the invention will more fully be apparent from the following detailed description with accompanying drawings.

DESCRIPTION OF THE PREFERRED EMBODIMENTS

Referring now to accompanying drawings, preferred embodiments of the reading apparatus related to the invention are described below.

Figure 1:
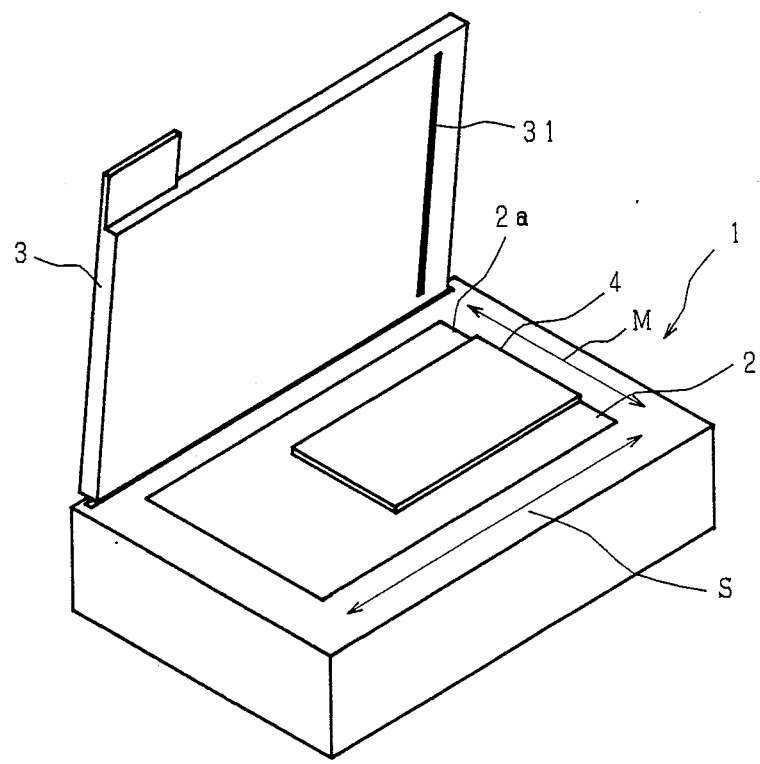
FIG. 1 is the external perspective view of the reading apparatus related to the invention.
Figure 2:
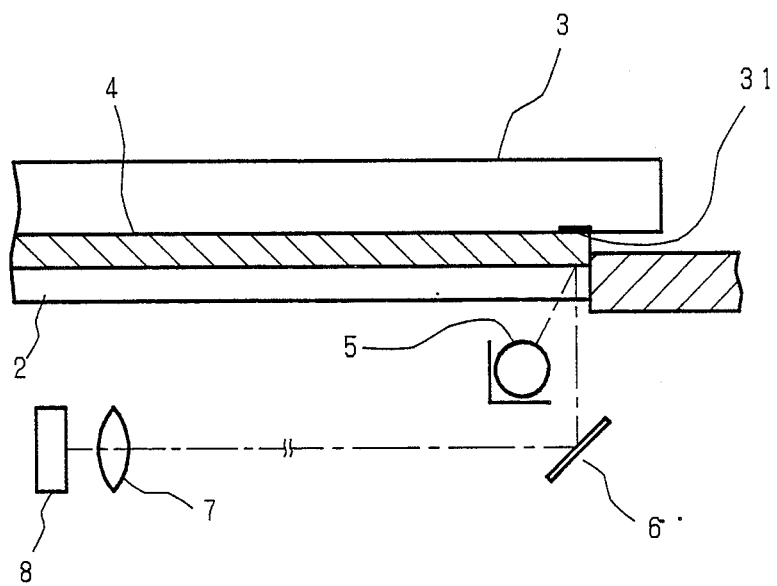
FIG. 2 is the simplified schematic diagram of the essential constituents of the reading apparatus related to the invention.

FIG. 1 is the external perspective view of the reading apparatus related to the invention. FIG. 2 is the simplified schematic diagram of the reading apparatus related to the invention.

The reading apparatus related to the invention is provided with a document table 1 having a glass sheet 2 on the upper surface, while a document cover 3 is installed to a side of this table 1 so that the cover 3 can freely be opened or closed. The preferred embodiment allows the reading apparatus to detect the size of document according to the width of the short side of document. The document 4 is mounted on the table 1 so that the short side of the document 4 can be aligned with the right edge of glass sheet 2. Length of the right edge of glass sheet 2 is determined to be the table width of the document table 1.

Belt-like color mark 31 for discriminating document is set on the document cover 3 at a position corresponding to and being opposite from the right edge of glass sheet 2, where color mark 31 has a specific color different from the base color of document 4 like black for example for distinguishing the document itself. In FIG. 2, numeral 5 is a lengthy light source illuminating the document, installed so that the longitudinal direction thereof can correctly match the main-scanning direction M. The light source 5 moves itself to the left, in other words to the sub-scanning directions, below the document 4 together with a reflection mirror 6 from the home position which is below the right edge 2a of glass sheet 2. Light reflected from the document 4 passes through lens 7 before reaching line image sensors 8 composed of charged-couple device (CCD) for example whose longitudinal direction correctly matches the direction M. As a result, information of the document is read, and then, based on the read signal, copying machine executes copying operation, or facsimile transmitter transmits information.

Size of the document 4 is detected before the light source 5 moves itself, in other words, while the light source 5 is at the home position.

Figure 3:
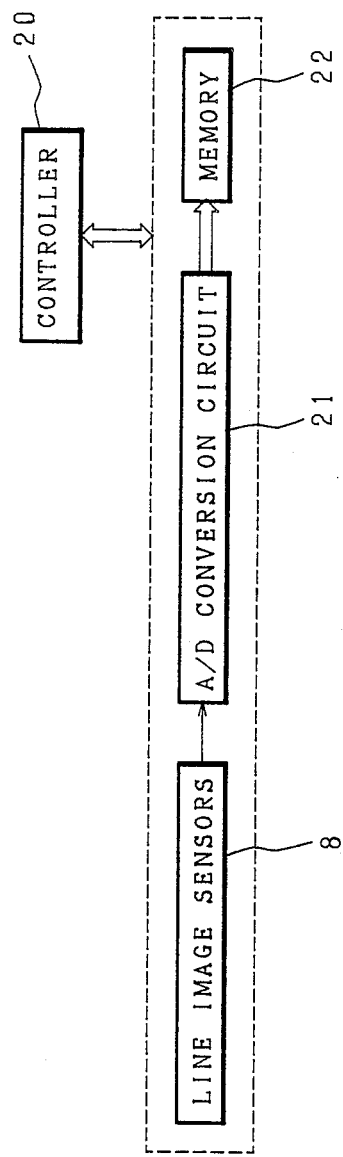
FIG. 3 is the simplified block diagram of the control system of reading apparatus related to the invention.

FIG. 3 is the simplified block diagram of the control system of the reading apparatus related to the invention. Controller 20 composed of a microprocessor allows A/D conversion circuit 21 is quantized a detecting signal of 1-line lot of line image sensors 8, i.e., a signal when the light source 5 is at the home position, and then the signal is stored in memory 22 before data is eventually delivered to controller 20. Memory 22 may also store such data which has been subtracted picture element within a scope that does not adversely affect the detection accuracy or such data like differential data for example, the format of data being not necessarily specified.

Figure 4:
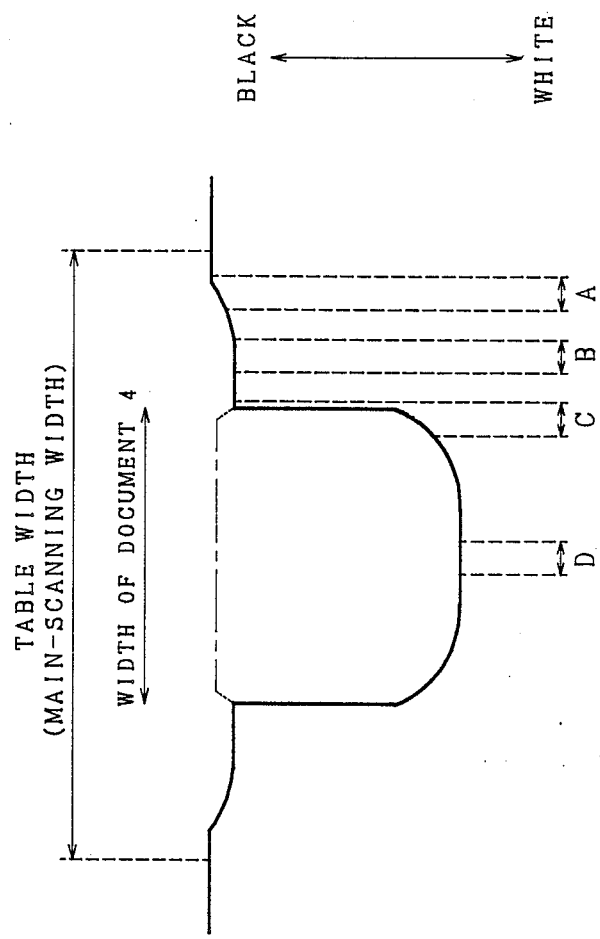
FIG. 4 is the waveforms of signals outputted from line image sensors.

FIG. 4 is an example of waveforms outputted from line image sensors 8. This represents that the document table 1 is exposed to external light while the document cover 3 remains open as shown in FIG. 1. Horizontal axis corresponds to main-scanning width, i.e., the table width. Characters A through D respectively denote the document-size detecting sections allocated in the table width. Document-size detecting sections A through C respectively deal with paper sizes A3, B4, and A4 for example according to the predetermined position of the table width, i.e., according to the position of side edges of document of various sizes mounted in the center. Character D is the center-detecting section for detecting the center of the table width, in other words, it detects the presence or absence of a document on the table 1. Vertical axis represents output level. The higher (or upper) the output level, the thicker the density of the document, in other words, it represents black document.

One-dot line shown in FIG. 4 represents outputted waveform when the light source 5 is off itself. Solid line represents outputted waveform when the light source 5 is on. Both waveforms are identical to each other in a range from both sides of the table width to the halfway of A4-size detecting section C. In other words, both waveforms are equal to each other up to both sides of the document 4, being slightly inclined to white side due to presence of external light. When the light source 5 is off, external light is shut off to cause the document position to slightly incline to black side. Conversely, this portion sharply inclines to white side when the light source 5 is on. When the light source 5 is on, the white level of the document 4 rises due to reflection of light, thus generating a certain difference from the white level when the light source 5 is off. The reading apparatus related to the invention detects the size of the document 4 by effectively applying this difference.

Next, operating procedure of the reading apparatus related to the invention is described below.

When the light source 5 is off, data is read out from memory 22 storing outputted signal from line image sensors 8, and then, continuous length of base color of the document and minimum value of the density of base color are calculated in paper-size detecting sections A through D respectively. The calculated values are stored in the memory of the controller 20. Density of base color portion of the document is assumed to be below a certain threshold value.

Next, when the light source 5 is turned on, and then, again continuous length of base color of the document and minimum value of the density of base color are calculated in paper-size detecting sections A through D in quite the same way as was done when the light source 5 was off. The calculated values are compared with the preceding values which have been calculated when the light source 5 was off and stored in its own memory. Finally, the size and the presence or absence of document are judged.

Figure 5:
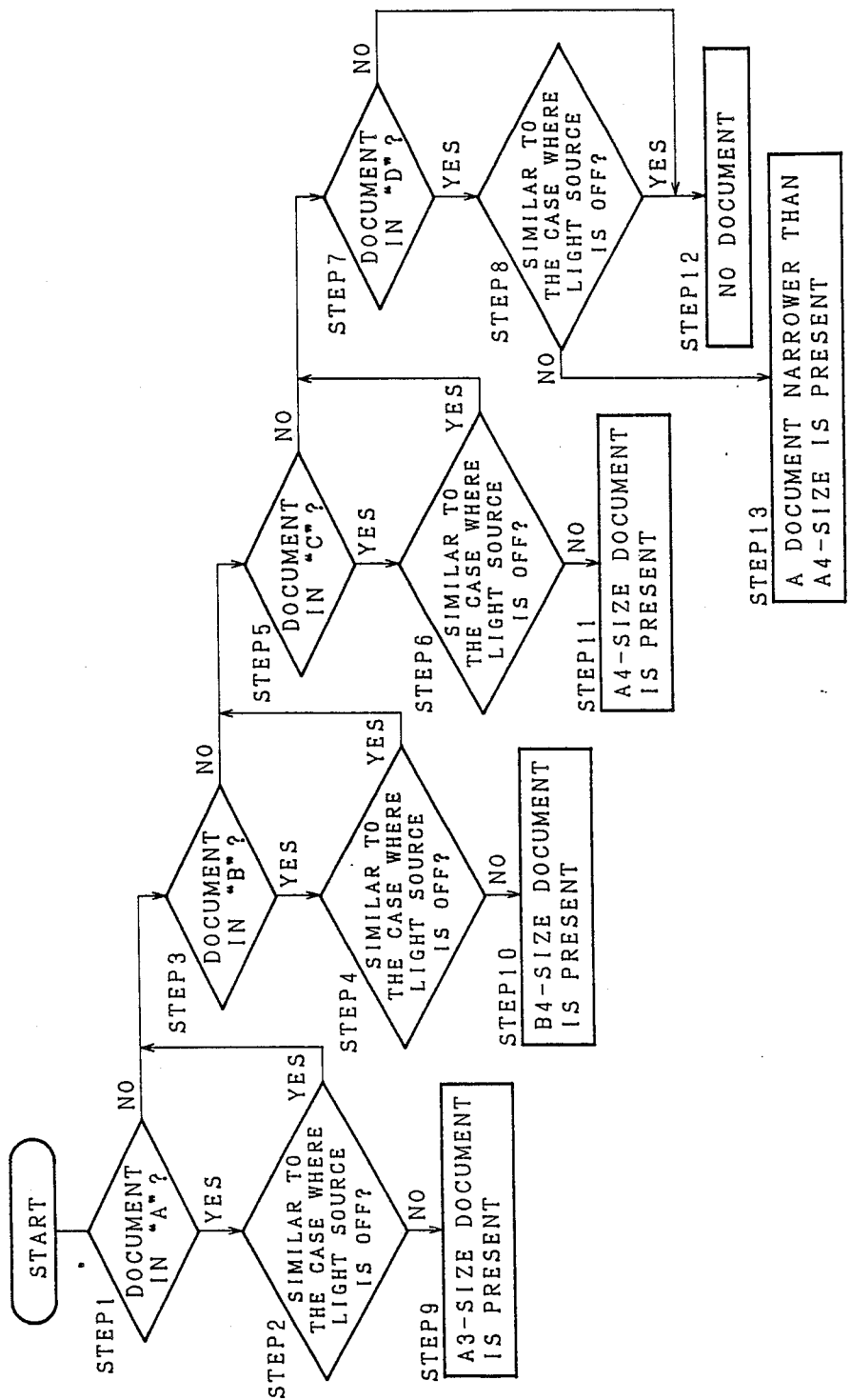
FIG. 5 is the flow chart denoting control operation of the reading apparatus related to the invention.

FIG. 5 is the flow chart representing the procedure for judging the size and the presence or absence of the document 4. The procedure for judging the size and the presence or absence of the document 4 is performed in A (A3-size detecting section), B (B4-size detecting section), to C (A4-size detecting section) and D (center-detecting section) sequentially. First, at step 1, whether a document is present in A3-size detecting section is judged. Presence of a document is judged when the continuous length of base color is longer than the predetermined value in A3-size detecting section when the light source 5 is on. The predetermined value is composed of a specific value allowing the document 4 to erroneously be detected by external light even when no document is present in A3-size detecting section under the circumstances in which external light enters into space opened by document cover 3, in other words, the predetermined value substantially has a value being less than the continuous length of base color of the false base color portion of the document. Consequently, while the document cover 3 is open, due to false base color portion of the document caused by external light, it is judged that a document is present on the table 1.

If it is judged that a document is present at step 1, then at step 2, whether outputted waveform when the light source 5 is on is similar to that when it is off is judged. It is judged that the former waveform is not similar to the latter waveform, in the case where the minimum value of density when it is off is greater than that when it is on, the continuous length of base color when it is on is longer than that when it is off and both differences are over the predetermined value respectively. Concretely, in reference to outputted waveforms shown in FIG. 4, when the light source 5 is off, a false base color portion of the document is detected in A3-size detecting section due to presence of external light. Even when the light source 5 is on, since there is no document actually, such a false base color portion is detected due to presence of external light. And yet, this false base color has a specific level identical to that is generated when light source 5 is off. Consequently, it is judged that the minimum values of density and the continuous lengths of base color are equal to each other both when the light source 5 is on and off. In other words, it is judged that these outputted waveforms are very close to each other.

If it is judged that these values are very close to each other, it means that no document is present in A3-size detecting section A, i.e., the size of the document is other than A3. At following step 3, in the same way at step 1, whether a document is present in B4-size detecting section B is judged. If it is judged that a document is present, whether the outputted waveform when the light source 5 is on is similar to that when it is off is judged at step 4 in the same way at step 2. In the same way, those conditions mentioned above are judged sequentially throughout all the paper-size detecting sections. The reading apparatus relative to this preferred embodiment detects size of the document 4 by sequentially executing those steps described below.

At step 5, since the side edge of the document 4 is in the A4-size detecting section C, when the light source 5 is on, actual base color portion of the document 4 is detected so that it is judged that the document 4 is present on the table 1. At step 6, whether both outputted waveforms are similar to each other is judged. Since the base color of the document in absence of illumination is falsely reproduced by external light, the minimum value of density approximates black. Conversely, since the base color of the document in presence of illumination is due to the document 4 actually being present, the minimum value of density is close to white. As a result, the minimum value of density in absence of illumination is larger than the minimum value of density in presence of illumination. Consequently, a difference between these minimum values of density is more than the predetermined value.

In accordance with false information, the continuous length of base color of the document in absence of illumination is calculated in only such part which is exposed to external light in the detecting section. In the detecting section, the part where the document 4 is actually present is part where external light is shut off from entering. In other words, this part is darker than such part which allows entering of external light. Despite the presence of the document 4, without allowing detection of basic color of document, it is assumed that no document is in this part. On the other hand, when the light source 5 is on, since the continuous length of basic color does not vary in the part receiving external light, a specific value equivalent to the continuous length of basic color generated by false information in absence of illumination is added to the actual continuous length of base color of the document. This causes the continuous length of base color under illumination to be longer than that in absence of illumination. When the difference between these values is more than the predetermined value, taking the result of the comparison of minimum values of density into account, it is judged that waveforms outputted from line image sensors 8 both in absence and presence of illumination are not similar to each other. At step 11, it is judged that an A4-size document is present to allow the reading system to detect that the document 4 has A4 size.

If it is also judged that the continuous length of base color of document has similarity between the cases with and without illumination at step 6, then at step 7, whether a document is present in the center-detecting section D is judged. In presence of illumination, if the document is not present on the table 1, the base color portion of the document is detected by false information generated by external light, whereas if the document is present on the table 1, the base color portion of the document is detected from the document itself. As a result, it is judged that the document is present on the table 1. At step 8, as was done in the preceding steps, whether outputted waveform in presence of illumination is similar to that in absence of illumination is judged. If the level of base color of the document remains unchanged due to false information generated by external light, the presence of similarity is judged. And then, at step 12, it is judged that no document is present on the table 1. Conversely, if it is judged that no similarity is present between those cases with and without illumination, at step 13, it is judged that there is a document narrower than A4-size on the table 1.

Those examples cited above have respectively referred to the case where the document cover 3 remains open under exposure to external light. On the other hand, when the document cover 3 is fully closed, due to presence of the color mark 31, the base color portion of the document is not detected from A3-size detecting section under illumination. In other words, it is judged that no document is present on the table 1 at step 1. At step 3 it is also judged no document is present on the table 1. At step 5, a true base color portion of the document is detected from the document 4, and thus, it is judged that a document is present on the table 1. At step 6, similarity between outputted waveforms both in presence and absence of illumination is judged. In absence of illumination, even if the document 4 is present on the table 1, since the document cover 3 is closed, the base color portion of the document is not detected, the minimum value of density is regarded as the maximum value at the black side and the continuous length of base color is zero.

Conversely, in presence of illumination, since the true base color portion of the document is detected, the minimum value of density inclines to white side. In other words, in absence of illumination, the minimum value of density becomes greater than that in presence of illumination. Since the continuous length of base color in absence of illumination is zero, the continuous length of base color in presence of illumination obviously becomes longer than that in absence of illumination. As a result, it is judged that no similarity is present between these, and then, at step 11, the reading apparatus detects that the document 4 has A4 size.

Independent of those preferred embodiments described above, the presence and absence of similarity between the cases with and without illumination is judged by applying expression below.

$$\frac{\text{Peak value of brightness}}{|\text{Peak value of brightness} - \text{Peak value of darkness}|} \quad (1)$$

where peak value of brightness denotes maximum value of white level in the paper-size detecting section in presence of illumination, and peak value of darkness denotes maximum value of white level in the paper-size detecting section in absence of illumination.

If the result of expression (1) shown above turns out to be in excess of the predetermined value like 2 for example, it is judged that similarity between both cases is present, whereas if the result of the above expression is less than the predetermined value, it is judged that no similarity is present between both.

The above preferred embodiment has used the light source for reading the document as the light source illuminating the document table. However, the invention also allows provision of such a light source solely for detecting the size of the document in place of the above document-reading light source.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A reading apparatus which automatically detects the presence or absence of a document on a document table, comprising;
   a light source which illuminates said document table;
   a collecting means which collects information about light intensity of said document table;
   a comparing means which compares said information when said light source is off with that when said light source is on; and
   means for determining the presence or absence of a document on said document table in accordance with the result of comparison executed by said comparing means.

2. The reading apparatus as set forth in claim 1, wherein said collecting means is composed of image sensors.

3. The reading apparatus as set forth in claim 1, wherein said information about light intensity relates to a continuous length and density of base color of said document.

4. The reading apparatus as set forth in claim 1, wherein said document table is provided with a document cover.

5. The reading apparatus as set forth in claim 4, wherein said document cover is provided with a color mark which absorbs the light from said light source.

6. The reading apparatus as set forth in claim 5, wherein said collecting means collects information about light intensity of the part corresponding to the position at which said color mark is provided when said document cover is shut.

7. The reading apparatus as set forth in claim 1, wherein said light source is moved to allow said collecting means to read information of a document by the illumination from said light source onto said document.

8. A reading apparatus which automatically detects the size of a document on a document table, comprising;
- a light source which illuminates said document table;
- a collecting means which collects information about light intensity of said document table;
- a comparing means which compares said information when said light source is off with that when said light source is on; and
- means for determining the size of said document in accordance with the result of comparison executed by said comparing means.

9. The reading apparatus as set forth in claim 8, wherein said collecting means is composed of image sensors.

10. The reading apparatus as set forth in claim 8, wherein said information about light intensity relates to a continuous length and density of base color of said document.

11. The reading apparatus as set forth in claim 8, wherein said document table is provided with a document cover.

12. The reading apparatus as set forth in claim 11, wherein said document cover is provided with a color mark which absorbs the light from said light source.

13. The reading apparatus as set forth in claim 12, wherein said collecting means collects information about light intensity of the part corresponding to the position at which said color mark is provided when said document cover is shut.

14. The reading apparatus as set forth in claim 8, wherein said information about light intensity is collected from a plurality of predetermined sections in the direction of the width of said document.

15. The reading apparatus as set forth in claim 8, wherein said light source is moved to allow said collecting means to read information of a document by the illumination from said light source onto said document.

* * * * *